(12) United States Patent
Lee et al.

(10) Patent No.: US 10,723,747 B2
(45) Date of Patent: Jul. 28, 2020

(54) LOW DK PHOSPHOROUS CONTAINING HARDENER USEFUL FOR HALOGEN FREE, FLAME RETARDANT POLYMERS AND USE

(71) Applicant: NAN YA PLASTICS CORPORATION, Taipei (TW)

(72) Inventors: Cheng-Chung Lee, Taipei (TW); Chen-Hua Wu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 16/137,400

(22) Filed: Sep. 20, 2018

(65) Prior Publication Data
US 2019/0092797 A1 Mar. 28, 2019

Related U.S. Application Data

(63) Continuation-in-part of application No. 14/869,512, filed on Sep. 29, 2015, now abandoned.

(51) Int. Cl.
| | |
|---|---|
| *C07F 9/6571* | (2006.01) |
| *C08L 63/00* | (2006.01) |
| *C08G 59/40* | (2006.01) |
| *C08G 59/62* | (2006.01) |
| *C08K 5/5313* | (2006.01) |
| *C08K 5/19* | (2006.01) |
| *C08K 3/36* | (2006.01) |
| *C08G 59/24* | (2006.01) |
| *B32B 27/38* | (2006.01) |
| *C08L 63/04* | (2006.01) |
| *C08G 8/28* | (2006.01) |

(Continued)

(52) U.S. Cl.
CPC ........ *C07F 9/657172* (2013.01); *B32B 27/38* (2013.01); *B32B 27/42* (2013.01); *C08G 8/28* (2013.01); *C08G 59/24* (2013.01); *C08G 59/4071* (2013.01); *C08G 59/621* (2013.01); *C08K 3/36* (2013.01); *C08K 5/19* (2013.01); *C08K 5/5313* (2013.01); *C08K 7/14* (2013.01); *C08L 61/06* (2013.01); *C08L 61/14* (2013.01); *C08L 63/00* (2013.01); *C08L 63/04* (2013.01); *C08L 63/08* (2013.01); *C08L 2201/02* (2013.01); *C08L 2205/025* (2013.01)

(58) Field of Classification Search
CPC ...................... C07F 9/657172; C08G 59/4071
See application file for complete search history.

(56) References Cited

U.S. PATENT DOCUMENTS

| | | | | |
|---|---|---|---|---|
| 3,647,444 A | * | 3/1972 | Borden | ................ C08F 283/01 |
| | | | | 430/285.1 |
| 6,617,028 B1 | * | 9/2003 | Hwang | ................... B32B 27/04 |
| | | | | 428/413 |

(Continued)

FOREIGN PATENT DOCUMENTS

| | | |
|---|---|---|
| WO | 2010114302 A2 | 10/2010 |
| WO | 2013000158 A1 | 1/2013 |

*Primary Examiner* — Megan McCulley
(74) *Attorney, Agent, or Firm* — Li & Cai Intellectual Property (USA) Office

(57) ABSTRACT

A Formula of a phosphorous fire-retardant hardener having fire-retardant and heat-resistant properties as well as a low-dielectric constant. With a preparation of glass-fiber laminated board, the hardener meets UL-94V fire-retardant requirements and has a dielectric constant 5 of 4.0 (1 GHz).

5 Claims, 4 Drawing Sheets

(51) Int. Cl.
*C08L 61/06* (2006.01)
*C08L 63/08* (2006.01)
*C08L 61/14* (2006.01)
*B32B 27/42* (2006.01)
*C08K 7/14* (2006.01)

(56) References Cited

U.S. PATENT DOCUMENTS

| | | |
|---|---|---|
| 8,124,716 B2 | 2/2012 | Gan |
| 8,841,388 B2* | 9/2014 | Lin ................... C07F 9/657172 525/481 |
| 2003/0120021 A1* | 6/2003 | Wang ................ C08G 59/4021 528/89 |
| 2004/0044168 A1* | 3/2004 | Hwang ................. B32B 27/04 528/89 |
| 2005/0247908 A1* | 11/2005 | Keller ............... C07F 9/657172 252/182.13 |
| 2011/0054077 A1* | 3/2011 | Gan .................. C07F 9/657172 523/451 |
| 2011/0266507 A1* | 11/2011 | Fuchs .................... C07F 9/3834 252/609 |
| 2011/0288206 A1* | 11/2011 | Fuchs .................. C07D 251/54 523/451 |
| 2012/0289663 A1* | 11/2012 | Mullins ............. C07F 9/657172 525/420 |
| 2014/0249253 A1* | 9/2014 | Worku ............. C07F 9/657172 523/451 |
| 2015/0031805 A1* | 1/2015 | Stockdale ............... C08K 5/005 524/91 |
| 2015/0072583 A1 | 3/2015 | Murata et al. |
| 2017/0022228 A1* | 1/2017 | Hu .................... C07F 9/657172 |
| 2017/0101507 A1* | 4/2017 | Lin .................... C07F 9/657172 |
| 2019/0092797 A1* | 3/2019 | Lee .................... C08G 59/4071 |

* cited by examiner

LOW DK PHOSPHOROUS CONTAINING HARDENER USEFUL FOR HALOGEN FREE, FLAME RETARDANT POLYMERS AND USE

FIELD OF THE INVENTION

The fire-retardant hardener made here can be used as a raw material for epoxy resin or cyanate ester resin or as a hardener for epoxy resin. Such a fire-retardant hardener can be used as an insulated material or an adhesive or paint for electronic components that must meet very respectable requirements, such as a laminated board covered with copper foil, EMC encapsulation and so forth.

BACKGROUND OF THE INVENTION

The present invention provides a high-performance phosphorous-containing hardener with excellent flame retardant and heat resistant characteristics, as well as a low dielectric constant with the following formula disclosed (see FIGS. 1A and 1B). When the phosphorous-containing hardener is formulated with compositions for laminate, it can pass the UL-94V0 flame retardant test, with the value of the dielectric constant being 4.0 (1 GHz), and does not experience delamination with 10 minutes of dipping in a 288° C. soldering test after two hours of the pressure cooking test.

This phosphorous-containing hardener may be used as a raw material for epoxy resin or cynate resin or as a hardener for epoxy resin. It can be used in a variety of applications, including, for example, insulating materials for highly reliable electronic components, such as EMC, PCB substrates, laminate and insulating plates that require excellent flame-retardant characteristics and thermal stability, adhesives, coating agents, and paint.

wherein n+y+m=2.5 to 3, the average value of n is 1 to 2.8, y is 0.1 to 1, m is 0.1 to 1 and x is 0 to 5.
(note: n or y or m group has four ortho-reactive contacts relative to the phenolic hydroxyl group on bisphenol A)

TECHNICAL FIELD

This invention consists of a new low-dielectric halogen-free phosphorous phenolic resin chemical compound. It can be applied to glass fiber laminated board, due to its good fire-retardant, low-dielectric and heat-insulated properties, as well as to high-performance PCB.

PRIOR ARTS

Regarding the previous fire-retardant technique of epoxy resin, a halogen compound (i.e. Tetrabromo bisphenol A) was added to endow its fire-retardant property while the epoxy resin was synthesized or the epoxy resin material was prepared. Brominated epoxy resin is widely used for fire-retardant electronic material due to its excellent fire-retardant property; however, some corrosive or toxic carcinogens (i.e. bromine hydride (HBr), Tetrabromobiphenyl dioxin, and Tetrabrom biphenyl) are emitted when a halogen fire-retardant agent is used during combustion, so it has been banned by the environmental protection law. From the environmental protection point of view, a phosphorous fire-retardant agent is still the best choice.

In recent years, phosphorous compounds (such as 3, 4, 5, 6-bibenzo-1, 2-phosphine-2 oxide (abbreviated as DOPO hereafter) or ODOP) and phosphorous compounds and epoxy resin both have been synthesized into phosphorous resin, which is widely used to make halogen-free FR-4 copper-covered glass fiber laminated board. In general, the phosphor content is between 2.5%~3.5% in phosphorous

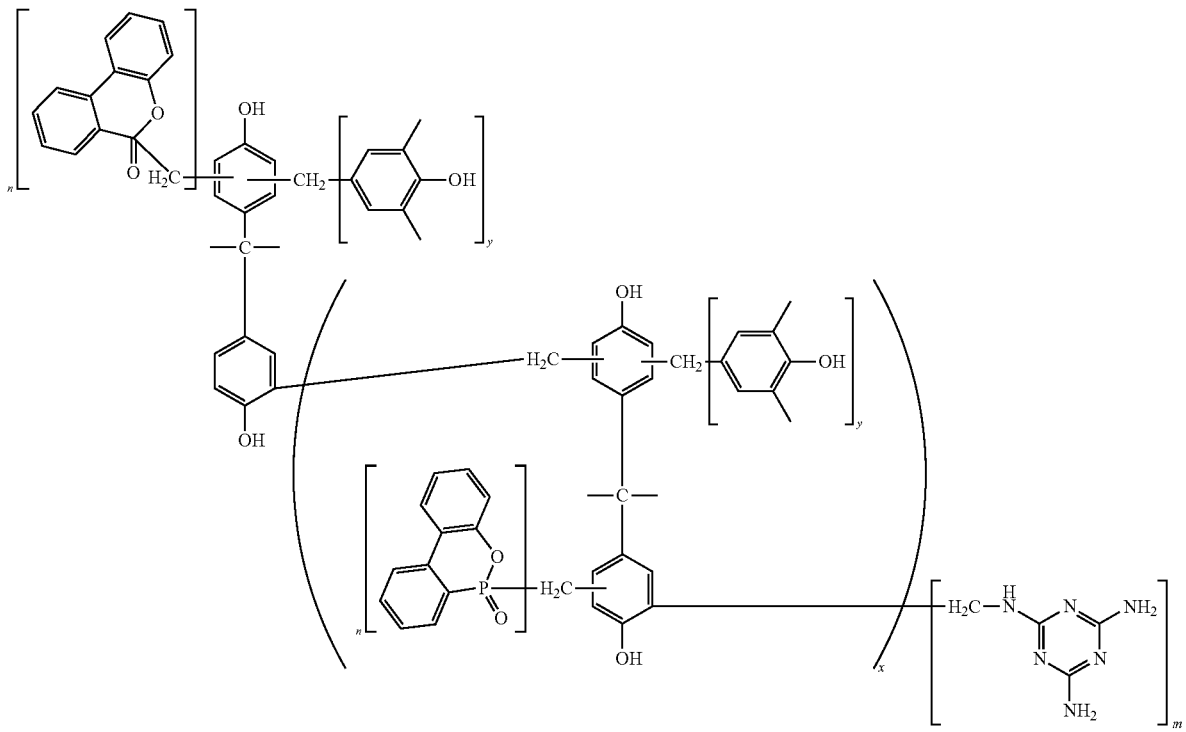

epoxy resin; however, board flammability may approach UL 94v-0 class when the phosphor content is between 1.8%~2.7% (phosphor content is lower if there is some fire-retardant chemical (such as phenolic resin or nitrogen) compound) in its formula. Phosphorous epoxy resin is a reactive fire-retardant agent, of which halogen-free copper-covered board is made, and has better comprehensive properties. However, after lead acting as an environmental hazardous substance was banned by ROHS or POHS environmental protection law, such that the welding temperature needs to rise while PCB is made and configured; therefore, upstream material is expected to act as a high heat-resistant, thermally stable, low wet absorptive and high adhesive fire-retardant polymer; however, prescription system acting phenolic resin as a hardener still has good heat resistant characteristics and is used perfectly during preparation for lead-free PCB. Wherein, phenolic resin hardener is about 20-40% of the formula weight, which results in inadequate phosphor content and thus lacks the fire-retardant property within the formula of phosphorous epoxy resin. To handle the aforementioned issue, the synthesis reaction needs a higher phosphor content for fire-retardant assurance; such a reaction inversely results in a greater molecular weight and lower density of the hardening bridge, as well as less Tg of hardened products and a deteriorated thermal property. This fails to meet the requirements for PCB.

Recently, new technology regarding manufacturing high-phosphor phenolic resin hardener to handle the aforementioned issue has been gradually proposed and has resulted in higher Tg, better fire-retardant characteristics and a heat-resistant property, and then such phosphorous phenolic resin hardener is added into glass fiber laminated board. However, with regards to electric products whose high-frequency signal transmission is required to be much faster, it is important for phosphorous phenolic resin hardener to consistently promote low-dielectric properties.

Along with the rapid development of high-frequency electronic products and with regards to the requirements banning environmentally hazardous substances (such as lead or halogen) under the environment protection law, a much higher temperature must be maintained while PCB is configured under reflow soldering; a higher temperature becomes much stricter with more creditable material, and the high-frequency signal transmission for electronic products is required to be much faster. Therefore, upstream materials (i.e. glass fiber laminated board) are expected to have high heat-resistance, a low dielectric constant, and halogen-free and fire-retard properties; however, the product that has a resin formula while phenolic resin (novolac) acts as the hardener shall have good heat resistance and low water-absorption, which has been gradually made into a creditable prescription system for lead-free procedures. To produce halogen-free, lead-free products, such as low dielectric glass fiber laminated board, low dielectric phosphorous phenolic hardener will become a new development trend and special focus in the future. To handle the aforementioned issue, this invention is provided with a new phosphorous resin hardener with good fire-retardant property, heat-resistance and a low-dielectric constant under PCB lead-free procedures, and glass fiber laminated board made with its formula shall meet UL-94V0 fire-retardant requirements and have a dielectric constant of 4.0 (1 GHz). First, it absorbed some water for 2 h with the pressure cooker test (PCT); however, it does not break even after dip soldering (at 288° C.) and maintains heat-resistance for more than 10 minutes.

The new low-dielectric phosphorous fire-retardant phenolic hardener's molecular structure is shown in FIG. 2:
wherein n+y+m=2.5 to 3, the average value of n is 1 to 2.8, y is 0.1 to 1, m is 0.1 to 1 and x is 0 to 5.
(note: n or y or m group has four ortho-reactive contacts relative to the phenolic hydroxyl group on bisphenol A)

Such a new phosphorous fire-retardant phenolic hardener's (compound) molecular structure design direction is based on phosphorous compound (DOPO) and low-dielectric compound 2,6 dimethyl phenol and nitrogen compound (melamine)(with good fire-retardant effect after nitrogen & phosphor react) respectively branching into bisphenol A and bisphenol A phenolic resin polymer to create an excellent low-dielectric property and a fire-retardant effect.

SUMMARY OF THE INVENTION

Preparation for such low dielectric phosphorous fire-retardant phenolic hardener is as follows: (1) 2,6 xylenol reacts with methanol and generates phenolic resin compound resol in alkaline catalyst. (2) 2,6 xylenol phenolic resin is added to bisphenol A and reacts to prepare phenolic resin (Novolac) after bisphenol A branches into 2,6 xylenol phenolic resin. (3) After step (2), it is put in an alkaline catalyst and reacts with an Aldehyde compound to generate phenolic resin compound (resol). Said resol dissolves into solvent and is then dipped and added into DOPO since DOPO active hydrogen has an extreme reaction with CH2—OH of phenolic resin compound (resol) dewater and makes DOPO branch bisphenol A-2,6 xylenol resin NOVOLAC (hereinafter abbreviated BDPD). (4) Finally, high Imino-NH Melamine-Formaldehyde Resin (CYMEL-327 named by Allnex as a product) is added into the BDPD obtained from step 3, and the melamine phenolic compound reacts with the remaining CH2-OH of BDPD resol to generate low-dielectric phosphorous fire-retardant hardener (hereinafter abbreviated BDPMD) for this invention. The reaction equation is as follows in FIG. 3.

With regards to chemical molecular structure, low-dielectric phosphorous fire-retardant hardener is accessed through 2,6 xylenol prepared under the core of this invention; said 2,6 xylenol is characterized by a highly symmetrical molecular structure, a low molecular coupling gap, good hydrophobic grouping, and a lower bioelectric constant than that of general phenolic resin (novolac hardener).

Phosphorous fire-retardant hardener for this invention can be used in a variety of industries, including PCB, EMC semi-conductor encapsulation and electric insulation material for other highly reliable motor/electronic components, as well as in good fire-retardant and thermally stable paints and adhesives.

BRIEF DESCRIPTIONS OF DRAWINGS

FIG. 1A and FIG. 1B: As the H Nuclear magnetic resonance spectra ($^1$HNMR) of the low-dielectric phosphorous phenolic resin hardener[1] disclosed in the invention, the compound dissolves into DMSO-$d_6$ (DMSO-$d_6$ chemical shift δ=2.48).

1. Chemical shift δ 0.7~1.5 represents absorption of the bisphenol A structure (CH$_3$—C—CH$_3$).
2. Chemical shift δ 1.9~2.1 represents absorption of the 2,6 xylenol structure (Ph—CH).
3. Chemical shift δ 3~3.8 represents absorption of P—CH$_2$—Ph and Ph—CH$_2$—Ph.
4. Chemical shift δ 6.4~8 represents absorption of Ph—H.

5. Chemical shift δ 9~9.3 represents absorption of Ph—OH.

6. Chemical shift δ 6.2~6.4 represents of N—H.

DETAILED DESCRIPTIONS

The explanation elaborated below shall make readers clearly understand this invention.

Figure 1A:
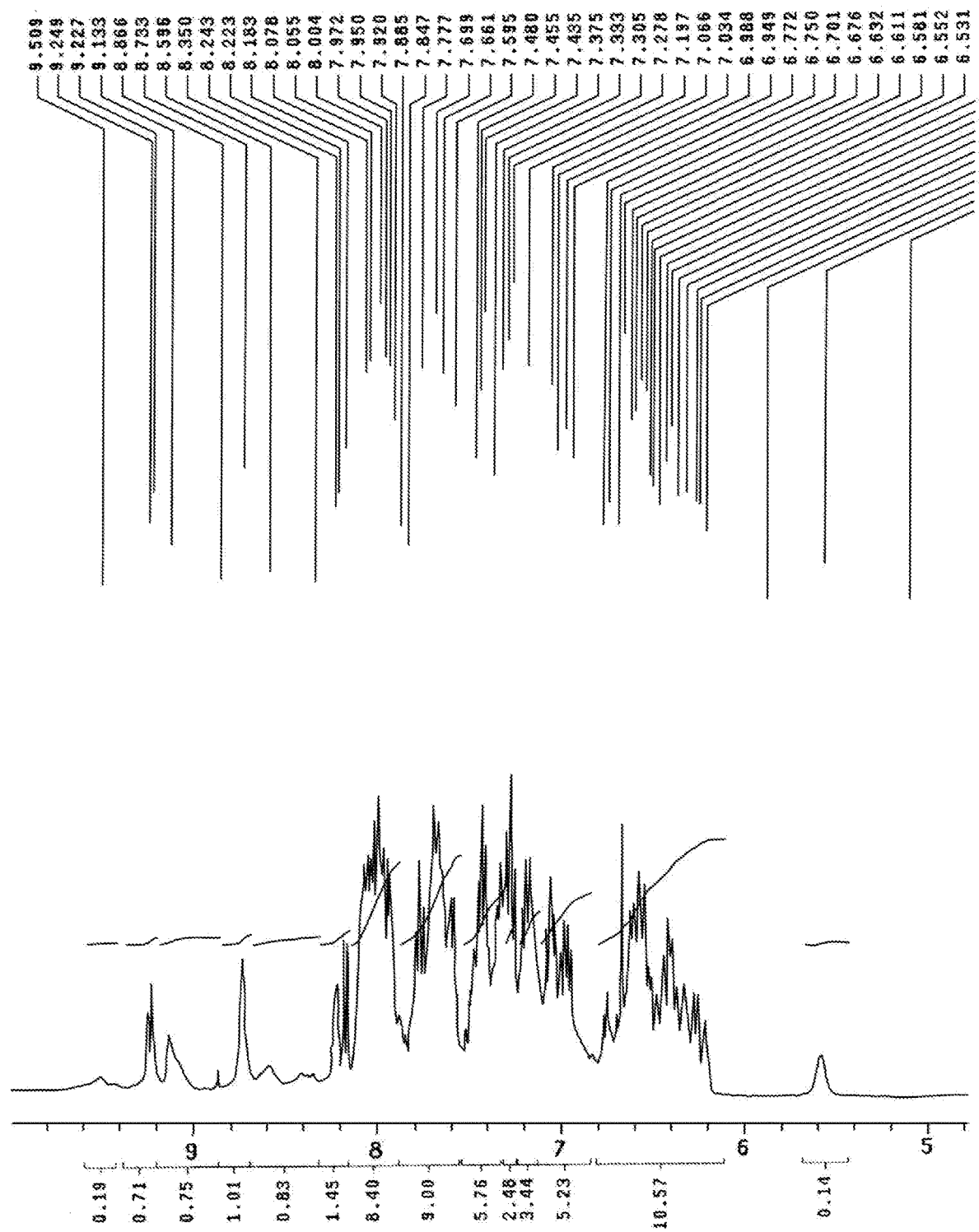
Figure 1B:
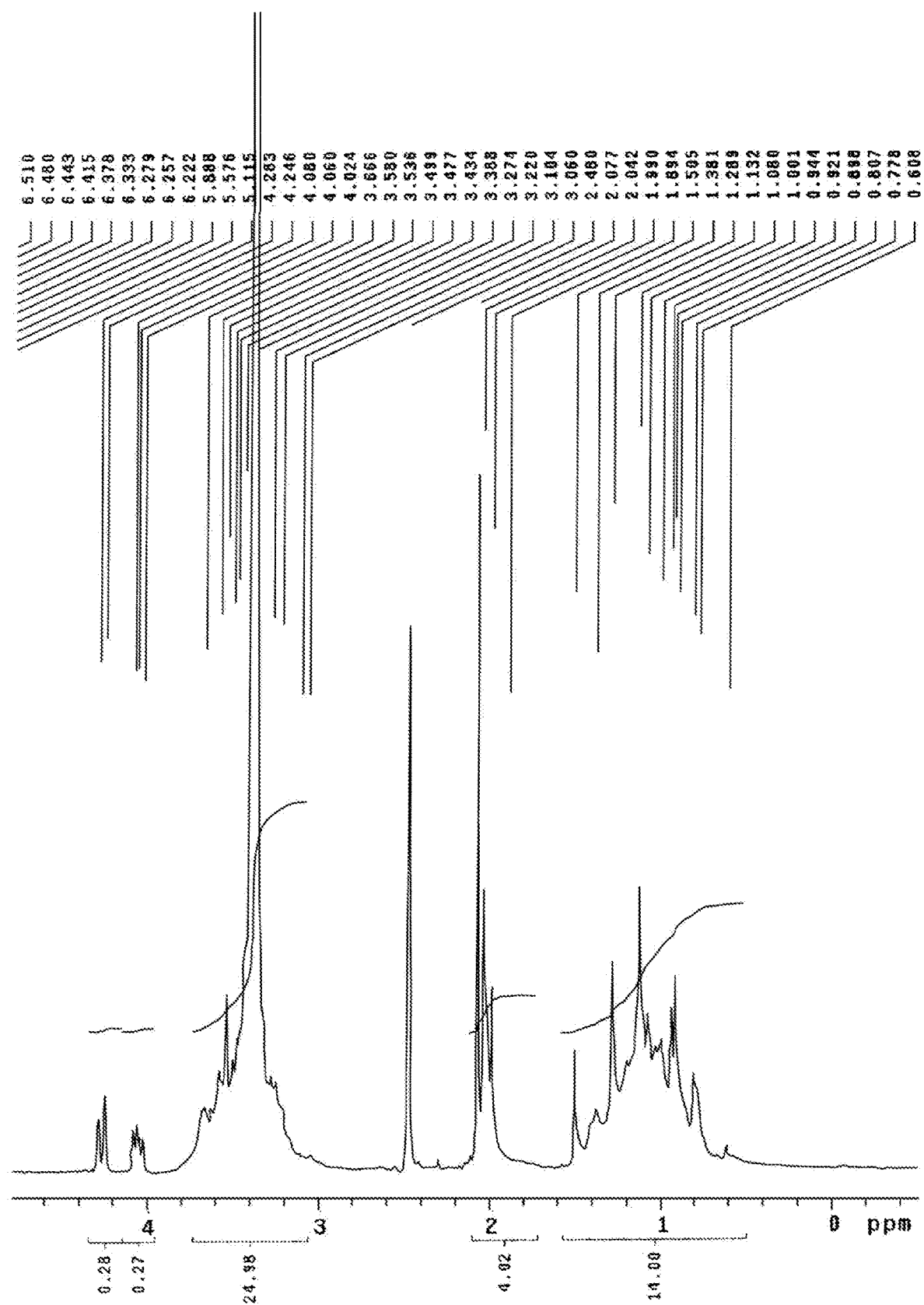
Figure 2:
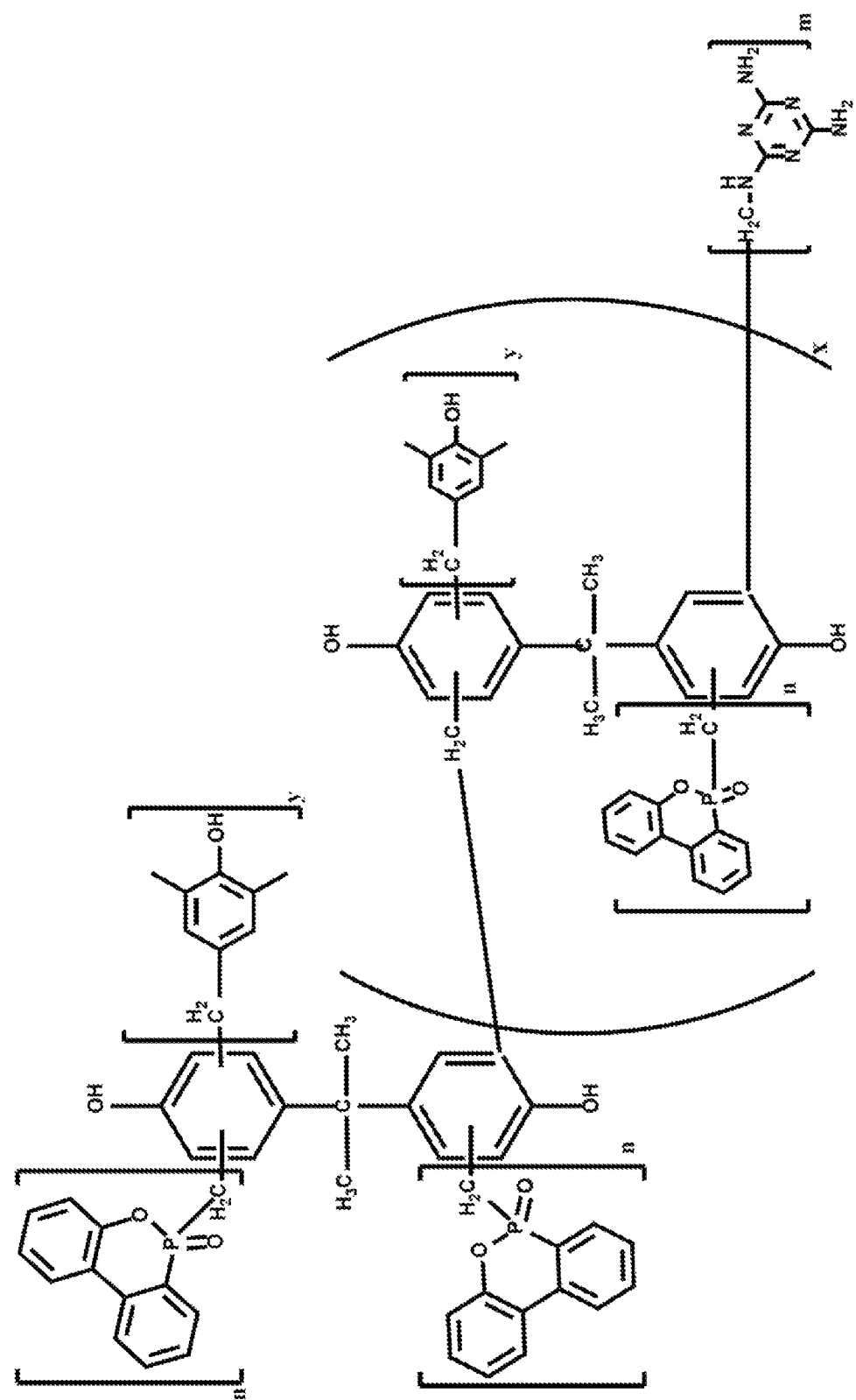
FIG. 2 is the new low-dielectric phosphorous fire-retardant phenolic hardener's molecular structure of present invention.
Figure 3:
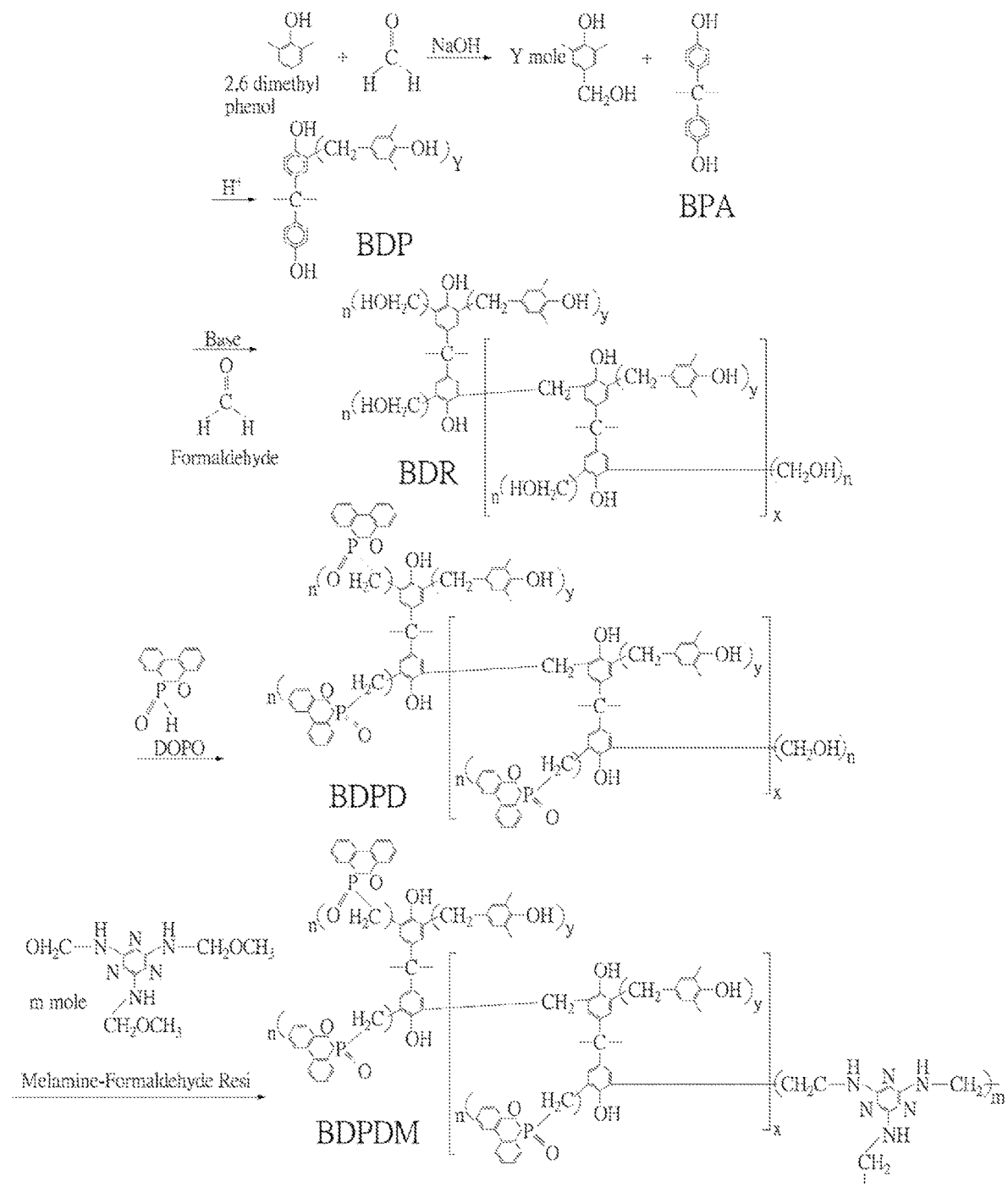
FIG. 3 is the reaction equation of present invention.

At the core of the invention, the highlight of the new low-dielectric phosphorous hardener proposes a phosphorous phenolic hardener (co-branched among bisphenol A (namely BPA), 2,6 xylenol (2,6 DMP) and melamine), whose chemical structure is characterized by the co-action of higher symmetrical and high-density benzene ring, polyfunctional base reaction phenolic OH, and phosphor/nitrogen fire-retardant properties. Therefore, it has good fire-retardant, heat-insulating and low-dielectric properties; such a low-dielectric phosphorous hardener has a phosphor content from 5% to 9.5%, much better than from 6% to 9.5%, with a nitrogen content of 0% to 2%. Particularly, preparing the low-dielectric phosphorous hardener of this invention includes: (1) Add 2,6 xylenol into an alkaline catalyst to react with methanol and generate phenol resin compound (resol). (2) Dip and add 2,6 xylenol resin compound (resol) in acid catalysis into bisphenol A to react with bisphenol A to prepare for phenolic resin (Novolac (hereinafter abbreviated BDP)) once bisphenol branches into 2,6 xylenol. (3) In the alkaline catalyst obtained from Step (2), it reacts with an aldehyde compound to generate resol; such resol dissolves into solvent, and then dipped and added to some DOPO. Such DOPO active hydrogen has an extreme reaction with the CH2-OH base grouping of resol (phenolic resin compound) and dewater and makes DOPO branch into bisphenol A-2,6 xylenol resin (Novolac) (hereinafter abbreviated BDPD). (4) Finally, regarding the Imino-NH Melamine-Formaldehyde Resin, whose product name when made by Allnex is CYME-327, some of the BDPD obtained in Step (3) is added into CYME-327, the Melamine formaldehyde (compound) reacts with CH2—OH resol remained for BDPD to generate the low-dielectric phosphorous fire-retardant hardener for the invention (hereinafter abbreviated BDPDM). The detailed chemical reaction formula for preparing the low-dielectric phosphorous hardener that is the core of this invention is as follows in FIG3.

Regarding the detailed description for preparing the low-dielectric phosphorous hardener of this invention, steps (1) through (4) are carried out. To first obtain novolac, the 2,6 xylenol branches into bisphenol A. (1) First, 2,6 xylenol reacts with methanal by alkaline catalyst and generates resol (phenol resin compound). Wherein, 2,6 xylenol reacts with aldehyde by 1:1 to 1:1.5 relative mole; such a reaction is induced at 30-70° C. for 20 min to 5 h, preferential for 2,6 xylenol that reacts with aldehyde at a rate of 1:3 to 1:4 relative mole and under 30-50° C. for 20-40 min. Meanwhile, resol (2,6 xylenol resin compound) is less hydrophilic than general phenol resin compound (resol), so resol easily dissolves into methyl isobutyl ketone (MIBK), neutralizes it and separates it from liquid after it is washed with water in order to remove residual alkaline catalyst and residual aldehyde. Finally, a high return is reached, and a low return that is reached after general phenolic resin compound (resol) is hydrophilic and dissolves into water. The alkaline catalyst is not particularly limited as long as it is used to react with phenolic resin compound (resol), including alkaline catalyst obtained about businesses, for example, sodium hydrate, potassium hydrate, sodium carbonate, potassium carbonate and amine, with 1-5% poly-formaldehyde (92%) for use under comparison with that of alkaline catalyst.

For step (2), in the acid catalyst, 2,6 xylenol resin compound (resol) is respectively dipped and added into bisphenol A to make it branch into bisphenol A. 2,6 xylenol resin (resol) is dipped and added into BPA (with acid catalyst). Because 2,6 xylenol phenolic resin compound (resol) is a reactive grouping, this relatively easier control branching rate of bisphenol A prevents phenolic resin compound (resol) self-polymerization, resulting in too high of a molecular weight (2,6 xylenol phenolic resin compound (resol) self-polymerization is only for dimer), which then results in some defects of the glass fiber laminated board processing film surface and severe deterioration of the physical properties of the hardening product. Otherwise, if BPA phenolic resin compound (resol) is dipped and added after bisphenol A reacts with it by alkaline catalyst, then resol is added into 2,6 xylenol to react with each other. As one mole BPA has four moles reactive groupings, so BPA phenolic resin compound (resol) has multiple reaction groupings and creates a self-polymerized reaction, which promises to create too high of a molecular weight and results in unexpected side reactions, as well as unexpected results. The acid catalyst used in step (2) may include an acid catalyst obtained in business, for example, oxalic acid, methane sulfuric acid (MSA), toluene-p-sulfuric acid (PTSA), sulfuric acid, hydrochloric acid, phosphorous acid, etc.

To prevent 2,6 xylenol resin (resol) self-polymerization, step (2) is taken to slowly dip and add it into bisphenol A; thus, such resol reacts with bisphenol A by relative mole quantity of 1:1 to 1:2, and such reaction lasts for 2-6 h in MIBK solvent under 80-120° C. The acid catalyst is only used at a rate of 0.5%-2% bisphenol A.

Step (3) is taken to branch BPA into phenolic resin products of 2,6 xylenol (resol) (abbreviated BDP), and it reacts with aldehyde to generate resol in alkaline catalyst; such alkaline catalyst has optimal selection as a low boiling-point amine, which is removed along with water by a vacuum pump after its reaction in order to remove residual amine and aldehyde from the water layer and reduces polymerization of resol under less than 75° C. In the case NaOH acts as a catalyst, it needs to be neutralized with acid to generate a sodium salt compound, which is subsequently removed with water, but such removal may result in some of the product dissolving into water and the organic layer severely separating from the water layer after washing with water, resulting in too low of a product harvest. Such method consists of BPA branching into 2,6 xylenol phenolic resin (BDP) at a mole rate (with aldehyde) of 1:1 to 1:3 and reacts for 1-6 h at 40-80° C., a harvest rate of over 99%. The alkaline catalyst is used at a rate of 1-5% poly-formaldehyde (92%).

The resol obtained in step (3) is dissolved into propylene glycol methyl ether (PM) as a solvent, then dipped and added into DOPO to react and generate the low-dielectric phosphorous hardener (hereinafter abbreviated BDPD). The resol (hereinafter abbreviated BDR) obtained in Step (3) has considerably important characteristics after adding it into DOPO for reaction; BPA branches into 2,6 xylenol resin resol (BDR) and a mole rate (with DOP) of 1:1 to 1:3 and better reacts with it at 135-145° C. After the reaction, water is immediately removed due to the high boiling point during its reaction. In case water exists, it reduces resol's reaction with DOPO; no reaction with DOPO inversely results in the side reaction of self-polymerization between two resol elements and causes a non-reaction residual phosphorous compound. Then, too low fire-retardant and other physical properties and objective fire-retardant hardener productivity and relative issues still remain. To reduce the aforementioned side reaction, resol is gradually dipped and added into DOPO; because dipping and adding may cause the resol and water concentration in the reaction system to maintain a lower level, this thus reduces the side reaction of self-polymerization of resol (phenolic resin compound). The reaction for dipping and adding lasts between two and six hours.

Once step (3) is completed, step (4) analyzes the residual DOPO of less than 0.1% (GPC Analysis of gel chromatography), and finally the high Imino-NH Melamine-Formaldehyde Resin, called CYMEL-327 when produced by ALLNEX, is added into the BDPD obtained in Step (3) at 145° C., so that Melamine formaldehyde reacts with the CH2—OH of the resol, branching melamine formaldehyde onto the BDPD compound to generate the low-dielectric phosphorous hardener of this invention. Such melamine formaldehyde reacts with bisphenol by a relative mole ratio of 0.005:1 to 0.005:1.5 and continues to react up to 185° C. for 30 minutes to 1 h and then fully reacts with the CH2-OH base grouping not reacted. Such a low dielectric phosphorous hardener has a phosphor content of 5% to 9.5%, relatively better than the usual 6% to 9.5%, and a nitrogen content of 0% to 2%.

A better implementation example for this invention shall be described in the following examples.

Implementation example 0 for the synthesis of the low-dielectric phosphorous hardener in this invention:

(1) Synthesis of resol (2,6 xylenol phenolic resin compound): 121.5 g (1 mole) 2,6 xylenol, 97.2 g 92% poly-formaldehyde (3 moles), 800 g pure water, and 5.7 g 49.5% Na—OH solution are placed into a reaction tank (1000 ml) and then heated up and mixed at 45° C. and reacted for 20 minutes. Afterwards, sulfur acid solution (30 g) is added for neutralization, and 230 g MIBK solvent is added for dissolution. The water layer is discharged after the liquid separates, and then what remains is washed twice with pure water (200 g). The MIBK layer is taken to obtain the MIBK solution (440 g) of 2,6 xylenol resin compound, with a return rate of 80% (analysis by HPLC hi-efficient analysis of liquid chromatography), finally obtaining resol (2,6 xylenol resin compound) for 0.75 mole.

(2) Synthesis of bisphenol A branches into 1 mole 2,6 xylenol resin (hereinafter abbreviated BDP): dissolve bisphenol A 228 g (1 mole) into 250 g MIBK solution and heat it to 115° C., then add methanesulfonic acid (70%, 2.1 g). Then the MIBK solution of resol (2,6 xylenol resin) is dipped and added by pump under a specified rating and is added into the MIBK solution of bisphenol A mentioned above, dip it for 6 h, add Na—OH (1.27 g, 49.5%) after its reaction, and then neutralize it and add 100 g water. Slowly mix it for 10 minutes at 75° C., keep it still to separate the solution, and remove the lower water layer, again add 100 g water into the upper organic phase, and wash it with water and mix it for 10 minutes; keep it still to separate the solution, wash with water twice, remove the water layer and take the organic layer from the upper one, and place it onto the rotating evaporator at 175° C.×5 torr for 3 h, remove the solvent MIBK and residual 2,6 xylenol to finally obtain 1 mole bisphenol A that branches into 0.75 mole 2,6 xylenol resin (hereinafter abbreviated BDP), with 313.5 g as the total and a return rate of 95%.

(3) Synthesis of bisphenol A branching into resol (2,6 xylenol resin) (hereinafter abbreviated BDPR): The BDPR branching into bisphenol A obtained in Step (2) above is balanced and has 300 g water added, and 92% poly-formaldehyde (97.8 g, 3 mole) added along with adding catalysis triethylamine 15 g, and reacted for 4 h at 60° C.; after the reaction, gradually reduce the vacuum to 10 torr, remove water and triethylamine at 75° C. and add PM (180 g) for dissolution at 75° C., thus obtaining 400 g resol compound (hereinafter abbreviated BDPR) branching with bisphenol, with a return rate of 99.5%.

(4) Synthesis of 2,6 xylenol resin (abbreviated as BDPD, hereafter) branching with bisphenol A: DOPO 626 g (2.9 mole) is placed into a reaction tank and heated to 140° C. to dissolve the DOPO, and then 2,6 xylenol resin resol (hereinafter abbreviated BDPR) is dipped and added by a rating pump into the reaction tank, and reacted for 4 h. After the reaction, the temperature is risen to 145° C. for a mature reaction for 2.5 h, then analyze for dopo residue of about 0.2%, thus obtaining 2,6 xylenol phosphorous resin (hereinafter abbreviated BDPD, 991 g) branching with bisphenol, with a return rate of 100%.

(5) Synthesis of phosphorous resin (BDPDM) that bisphenol A branches with 2, 6 xylenol and methyl etherified melamine: Continue to Step (4), analyze for residual phosphorous resin (hereinafter abbreviated BDPD) that bisphenol A branches with 2,6 xylenol resin at less than 0.2%, and add methyl etherified melamine and formaldehyde (CYMEL-327, produced by ALLNEX, 90% solid in butanol, 71.7 g, 0.25 mole) at 145° C. and react for 1 h; heat it to 185° C. and react for 1 h; within 30 minutes after vacuum reduction of pressure and removal of solvent PM, this obtains the low-dielectric phosphorous resin hardener specified in this invention, namely phosphorous resin (hereinafter abbreviated BDPDM, 1032 g in total) that bisphenol A branches with 2,6 xylenol and methyl etherified melamine, with a phosphor content of 8.95, nitrogen content of 1% and return rate of 99.5%.

FTIR result: phenolic —OH group and amine: 3226 cm$^{-1}$, P=O 1197 cm$^{-1}$/1280 cm$^{-1}$, and P—O—C (aromatic hydrocarbon) 921 cm$^{-1}$/1117 cm$^{-1}$ P—C aromatic base 1431 cm$^{-1}$.

$^1$H-NMR result: Chemical shift δ 0.7~1.5 represents the absorption for $CH_3$—C—$CH_3$; Chemical shift δ 1.9~2.1 the absorption for Ph-$CH_3$; Chemical shift δ 3~3.8 the absorption for P—$CH_2$—Ph and Ph—$CH_2$—Ph; Chemical shift δ 6.4~8 the absorption for Ph—H. Chemical shift δ 9~9.3 the absorption for Ph—OH. Chemical shift δ 6.2~6.4 the absorption for N—H.

EXAMPLES 1~3

The glass fiber laminated board to which the low-dielectric phosphorous fire-retardant hardener specified in this invention can be applied consists of resin varnish, which has good fire-retardant and heat-resistant characteristics and a low dielectric constant; its make-up is shown in Table (1). By solvent (i.e. PM, butanone or ketone), adjust for the prescribed contents of Varnish (solid content of 65%), prepare for glass fiber laminated board in the traditional manner, and immerse 7628 glass fiber cloth into aforesaid resin liquid; then dry it under 170° C. for several minutes (including immersion temperature). Relying upon adjustment and control and the drying interval, adjust the pre-immersed body for the lowest-melting viscosity within 4000-10000 poise, overlap eight pieces of pre-immersed body into two pieces 35 um thick copper foils, and control the temperature rise procedure under 25 kg/cm².

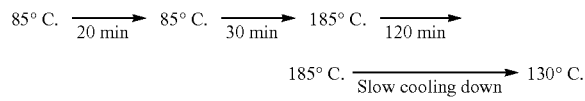

The 1.6 mm thick copper foil base board is obtained after thermal pressing.

COMPARISON EXAMPLES 1~2

In case of not using the low-dielectric phosphorous fire-retardant hardener specified in this invention, and regarding other fire-retardant agents for comparison, comparison example 1 applies to a Br fire-retardant agent (TBBA); comparison example 2 applies to general bisphenol A phenolic resin hardener (Nanya Plastic Company, Model: NPEH-720ha65) and phosphorous epoxy resin; its make-up is shown in Table (2).

TABLE 1

Example for varnish and glass fiber laminated board physical properties

| | | Example 1 | Example 2 | Example 3 |
|---|---|---|---|---|
| Prescribed content of resin varnish | DCPD-PNE poly-functional epoxy resin, Nanya Plastic NPPN-272H | 24.2 | — | — |
| | BPA-PN poly-functional epoxy resin Nanya Plastic NPPN-438 | — | 33 | 19.2 |
| | NPPN epoxy resin Nanya Plastic NPPN-431 | — | 2.6 | — |
| | 2,6 xylenol bi-functional epoxy resin Nanya Plastic NPPN-260 | 14.5 | — | — |
| | Bisphenol A epoxy resin EL-128E | — | — | 7.7 |
| | Solid bisphenol A epoxy resin ES-901 | — | — | 11.5 |
| | BPA-PN phenolic resin hardener Nanya Plastic NPEH-720H | 13.8 | 16.8 | 14.4 |
| | Low-dielectric phosphorous hardener 1 specified in this invention | 17.5 | 17.5 | 17.2 |
| | Filler SiO2 | 30 | 30 | 30 |
| | Hardening catalytic agent-bi-methyl imidazole 2MI | 0.08 | 0.06 | 0.08 |
| | Solvent, PM | 66 | 66 | 66 |
| Gel time | Varnish gel time s/170° C. | 120 | 122 | 125 |
| | Preparing gel time s/170° C. | 90 | 88 | 92 |
| Physical properties of glass fiber laminated board | Phosphor content % | 2.3 | 2.3 | 2.3 |
| | Fire-retardant property | UL-94V0 | UL-94V0 | UL-94V0 |
| | Glass transition temperature Tg ° C. | 155 | 180 | 158 |
| | Water absorption rate % (PCT pressure cooker for 2 h) | 0.26 | 0.25 | 0.4 |
| | Heat-resistance for tin soldering at 288° C. (after PCT pressure cooker for 2 h) | >10 m No broken board | >10 m No broken board | >10 m No broken board |
| | Dielectric constant Dk (1 GHz) | 4.0 | 4.2 | 4.25 |
| | Dissipation factor Df (1 GHz) | 0.014 | 0.016 | 0.016 |

TABLE 2

Comparison of physical properties for varnish and glass fiber laminated board

| | | Comparison Example 1 | Comparison Example 2 |
|---|---|---|---|
| Make-up of varnish | PNE phosphorous epoxy resin, phosphor = 4%, NPEP-210H | — | 34.8 |
| | BPA-PN poly-functional epoxy resin NPPN-438 | 31.8 | 12.1 |
| | NPPN epoxy resin NPPN-431 | 3.9 | 2.7 |
| | BPA-PN phenolic resin hardener NPEH-720H | 12.9 | 20.4 |
| | TBBPA | 21.5 | — |
| | Filler SiO2 | 30 | 30 |
| | Hardening catalytic agent - bimethyl imidazole 2MI | 0.06 | 0.08 |
| | Solvent ketone | 66 | 66 |
| Physical properties of glass fiber laminated board | Phosphor content % | — | 2.0 |
| | Br content % | 18 | — |
| | Fire-retardant property | UL-94V0 | UL-94V1 |
| | Glass transition temperature Tg (° C.) | 183 | 146 |
| | Water absorption rate % (PCT pressure cooker for 2 h) | 0.3 | 0.3 |
| | Heat-resistance for tin-immersed soldering heat-resistance at 288° C. (PCT pressure cooker for 2 h) | >10 min No broken board | >10 min No broken board |
| | Dielectric constant Dk (1 GHz) | 4.6 | 4.6 |
| | Dissipation factor Df (1 GHz) | 0.018 | 0.018 |

The above test results indicate that glass fiber laminated board prepared as prescribed and with the introduction of the phosphorous low-dielectric phenolic hardener specified in this invention has reduced its dielectric constant (DK) to 4.0. With the comparison examples, the dielectric constant can be reduced from 4.6 to 4.2, still indicating that this phosphorous low-dielectric phenolic hardener can reduce the dielectric constant and is applicable to PCB used for fast transmission high-frequency and high-rate signals.

1. Varnish Gel Time

The varnish reactive prepares for the varnish mixture by epoxy resin solution and hardener bi-cydiamide solution (dissolved into solvent DMF, 13.3% concentration) and catalytic agent 2-phenyl imidazole.

Or using 2-methyl imidazole solution (dissolved into solvent DMF, concentration of 14.28%), such a varnish mixture is dipped into a hot board (about 0.3 ml) at a board temperature of 170° C., and then the time it takes to gel is recorded.

2. Pre-Immersed Gel Time

The pre-immersed body test method is performed to weigh its powder (0.2 mg) and is placed onto a hot board with a temperature of 170° C., and the time it takes to gel is recorded.

3. Test for Water Absorption Rate (PCT Pressure Cooker for 2 h)

The test method of the water absorption rate is taken so that the base board is cut into a square sample piece (5 cm²) after etching and is baked for 2 h in an oven (105° C.). It is placed into a pressure cooker under 2 atm×120° C., and the weight of the gas is recorded after 120 min, which, divided by the initial weight of the sample piece, obtain its water absorption rate.

4. Tin-Soldering Resistance and Heat-Resistance at 288° C. (PCT Pressure Cooker for 2 h)

This test method is taken to immerse sample tests from the pressure cooker into a tin soldering oven (288° C.), and the time required by the sample broken board as it laminates is recorded.

5. Test of Dielectric Constant:

This test method is taken to use a glass fiber laminated board (5 cm×5 cm square sample piece) after the cooper foil is removed, and then bake it for 2 h in an oven (105° C.), measure it with the thickness by thickness test meter, and then clamp it into the dielectric constant test meter; the value of the three points of data is taken as the average value.

6. Test of Dissipation Factor:

This test method is taken to use a glass fiber laminated board (5 cm×5 cm square sample piece) after the cooper foil is removed, and then bake it for 2 h in an oven (105° C.), measure it with the thickness by thickness test meter, and then clamp it into a dielectric constant test meter; the value of the three points of data is taken as the average value.

7. Test of Temperature of Glass Transition:

Using a differential scanning calorimeter, abbreviated DSC, the temperature is risen at a rate of 20° C./min.

8. Test of Fire-Retardant Property

The fire-retard property of the sample is tested under the UL-94 standard method.

What we claimed are:

1. A low-dielectric phosphorous phenolic hardener has the following formula I:

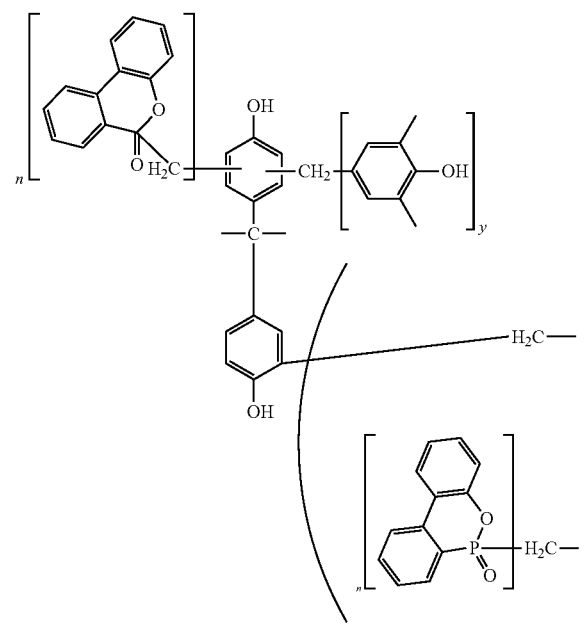
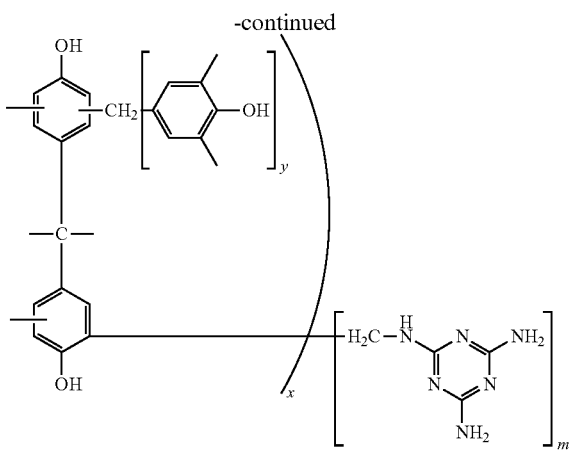

wherein n+y+m=2.5 to 3, the average value of n is 1 to 2.8, y is 0.1 to 1, m is 0.1 to 1 and x is 0 to 5; wherein, n or y or m group has four ortho-reactive contacts relative to the phenolic hydroxyl group on bisphenol A.

2. A process for the preparation of low-dielectric phosphoric phenolic resin hardener according to claim 1, comprising following step (1) to step (4):

step (1): reacting 2,6 xylenol with 92% concentration paraformaldehyde in the presence of an alkaline catalyst to obtain a resol; wherein the mole ratio of 2,6 xylenol and 92% concentration paraformaldehyde is from 1:1 to 1:5, the reaction time is from 20 min to 5 hours, and the reaction temperature is 30-70° C.; wherein, the alkaline catalyst is at least one selected from the group consisting of NaOH, KOH, $CaCO_3$, $K_2CO_3$, and amine, the amount of the alkaline catalyst is 1-5% based on the 92% concentration paraformaldehyde;

dissolving the resol into 4-methylpentan-2-one, neutralizing and removing the solution after washing it with water to remove the residual alkaline catalyst and 92% concentration paraformaldehyde in a water layer;

step (2): reacting the resol and bisphenol A in the presence of an acid catalyst to graft bisphenol A on the resol and obtain a copolymer (BDP) of bisphenol A and 2,6-dimethyl phenol; wherein the acid catalyst is at least one selected from the group consisting of oxalic acid, methanesulfonic acid, 4-methylbenzenesulfonic acid, sulfur acid, hydrochloric acid, and phosphor acid; wherein, a mole ratio of the resol to the bisphenol A is from 1:1 to 2:1; the reaction is in the presence of 4-methylpentan-2-one at 80~120° C. for 2-6 hours, and the amount of the acid catalyst is 0.5 to 2% based on the amount of the bisphenol A;

step (3): reacting the copolymer (BDP) and 92% concentration paraformaldehyde in the presence of an a low boiling-point amine catalyst to obtain a resol (BDR); after the reaction, separating the residual amine and residual aldehyde by a vacuum pump under 75° C.; wherein, a mole ratio of the copolymer (BDP) and the 92% concentration paraformaldehyde is from 1:1 to 1:3, the reaction temperature is from 40 to 80° C., the reaction time is from 1 to 6 hours and a yield rate is more than 99%; the amount of the low boiling-point amine catalyst is 1-5% based on the amount of 92% concentration paraformaldehyde;

dissolving the resol (BDR) obtained in Step (3) into a propylene glycol monomethyl ether solvent and then add it into 9,10-Dihydro-9-oxa-10-phosphaphenanthrene 10-oxide for a reaction to obtain a product (BDPD) of 9,10-Dihydro-9-oxa-10-phosphaphenanthrene 10-oxide grafting copolymer (BDP), wherein the mole ratio of copolymer (BDP) and the 9,10-Dihydro-9-oxa-10-phosphaphenanthrene 10-oxide is from 1:1 to 1:3 and the reaction temperature is from 135 to 145° C.; the reaction time is from 2 to 6 hours;

step (4): once the reaction of step (3) is completed, analyze the product (BDPD) by GPC gel chromatography until the residual 9,10-Dihydro-9-oxa-10-phosphaphenanthrene 10-oxide is less than 0.1%, add a melamine formaldehyde into the 9,10-Dihydro-9-oxa-10- phosphaphenanthrene 10-oxide grafting copolymer (BDP) obtained from Step (3) at 145° C. to make the melamine formaldehyde graft onto the 9,10-Dihydro-9-oxa-10-phosphaphenanthrene 10-oxide grafting copolymer (BDP) and yield the low-dielectric phosphorous phenolic hardener; the mole ratio of the melamine formaldehyde and bisphenol A is from 0.05:1 to 0.5:1.0, and the reaction time is from 1 to 2 hours at the beginning and continue in a reaction temperature to 185° C. for 30 min to 1 hours; wherein, the phosphor content of low-dielectric phosphorous phenolic hardener is from 6% to 9.5% and the nitrogen content is from 0% to 2.0%.

3. The process for the preparing the low-dielectric phosphorous phenolic hardener according to claim 2, wherein in step (1), the mole ratio of 2,6 xylenol and 92% concentration paraformaldehyde is from 1:3 to 1:4, the reaction time is from 20 to 40 minutes, and the reaction temperature is from 30 to 50° C.

4. An epoxy resin varnish composition used for glass fiber laminated board, comprising:
(i) 10% to 70% of poly-functional phenolic epoxy resin based on the total weight of the total resin (i) to (iv);
(ii) 0% to 30% of bi-functional base epoxy resin based on the total weight of the total resin (i) to (iv);
(iii) 0% to 30% of phenolic resin hardener or bisphenol A phenolic resin hardener based on the total weight of the total resin (i) to (iv);
(iv) 10% to 40% of low-dielectric phosphorous phenolic hardener as claim 1 based on the total weight of the total resin (i) to (iv);
(v) 0% to 45% of filler based on the total weight of the epoxy resin varnish composition, wherein the filler is silicone dioxide or aluminum hydroxide;
(vi) 0.01% to 0.2% of a hardener catalyst based on the total weight of the epoxy resin, not including hardener, wherein the hardener catalyst is at least one selected from the group consisting of imidazole, quaternary amine, and quaternary phosphor salt;
(vii) 55% to 70% of a solvent based on the total weight of solid of the epoxy resin varnish composition, the solvent is at least one selected from the group consisting of acetone, butanone, cyclohexanone, 2-methoxyethanol and propylene glycol monomethyl ether.

5. The epoxy resin varnish composition used for glass fiber laminated board according to claim 4, wherein the poly-functional phenolic epoxy resin is dicyclopentadiene phenol poly-functional epoxy resin, and the bi-functional base epoxy resin is 2,6 xylenol phenolic bi-functional epoxy resin, and the hardener catalyst is di-methyl imidazole or xylenol imidazole.

* * * * *